(12) United States Patent
Cutler

(10) Patent No.: US 8,717,402 B2
(45) Date of Patent: May 6, 2014

(54) SATELLITE MICROPHONE ARRAY FOR VIDEO CONFERENCING

(75) Inventor: Ross G. Cutler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 13/461,229

(22) Filed: May 1, 2012

(65) Prior Publication Data

US 2012/0218371 A1 Aug. 30, 2012

Related U.S. Application Data

(62) Division of application No. 12/163,451, filed on Jun. 27, 2008, now Pat. No. 8,189,807.

(51) Int. Cl.
*H04N 7/14* (2006.01)

(52) U.S. Cl.
USPC ............... 348/14.01; 348/14.02; 348/14.03; 348/14.08; 348/14.09; 348/14.1

(58) Field of Classification Search
USPC ................. 348/14.01, 0.02, 0.03, 0.08, 0.09
See application file for complete search history.

(56) References Cited

U.S. PATENT DOCUMENTS

| | | | |
|---|---|---|---|
| 6,914,989 B2 | 7/2005 | Janse et al. |
| 7,039,199 B2 | 5/2006 | Rui |
| 7,084,801 B2 | 8/2006 | Balan et al. |
| 7,116,791 B2 | 10/2006 | Matsuo |
| 7,123,727 B2 | 10/2006 | Elko et al. |
| 7,133,530 B2 | 11/2006 | Poletti |
| 7,149,315 B2 | 12/2006 | Johnston et al. |
| 7,158,645 B2 | 1/2007 | June et al. |
| 7,203,323 B2 | 4/2007 | Tashev |
| 2002/0097885 A1 | 7/2002 | Birchfield et al. |
| 2004/0252845 A1 | 12/2004 | Tashev |
| 2005/0008169 A1 | 1/2005 | Muren et al. |
| 2006/0017805 A1 | 1/2006 | Rodman |
| 2007/0058879 A1 | 3/2007 | Cutler et al. |
| 2008/0247565 A1 | 10/2008 | Elko et al. |

OTHER PUBLICATIONS

Microsoft informational datasheet, "Microsoft RoundTable," http://download.microsoft.com/download/7/8/f/78f7baf8-f80a-4d87-8edb-236bc3977617/Microsoft%20RoundTable%20Datasheet.pdf 2007, pp. 1-2.

C.D. Hughes & J. Horle, "The DICE Multi-site Satellite Videoconference System, European Space Agency, Bulletin Nr. 80," published Nov. 1994, http://www.esa.int/esapub/bulletin/bullet80/hughe80.htm , Printed Nov. 5, 2007, pp. 1-7.

Go electronic, Revolabs Solo Desktop Wireless Conference Microphone System, Date: Nov. 5, 2007, pp. 1-2, http://www.goelectronic.com/Merchant2/merchant.mvc?Screen=PROD&Product_Code=REVOLABS+SOLO+Desktop.

Microphone Array Project in Microsoft Research, Date: Nov. 5, 2007, pp. 1-3, http://research.microsoft.com/users/ivantash/MicrophoneArrayProject.aspx.

Jean-Marc Valin et al., "Robust Sound Source Localization Using a Microphone Array on a Mobile Robot," Published 2003 http://people.xiph.org/~jm/papers/iros.pdf, Nov. 5, 2007, pp. 1-6.

*Primary Examiner* — Joseph J Nguyen
(74) *Attorney, Agent, or Firm* — Sonia Cooper; Jim Ross; Micky Minhas

(57) ABSTRACT

Speakers are identified based on sound origination detection through use of infrared detection of satellite microphones, estimation of distance between satellite microphones and base unit utilizing captured audio, and/or estimation of satellite microphone orientation utilizing captured audio. Multiple sound source localization results are combined to enhance sound source localization and/or active speaker detection accuracy.

18 Claims, 11 Drawing Sheets

SATELLITE MICROPHONE ARRAY FOR VIDEO CONFERENCING

CROSS-REFERENCE TO RELATED APPLICATIONS

This application is a divisional of application Ser. No. 12/163,451, filed Jun. 27, 2008. The aforementioned application is hereby incorporated by reference, in its entirety.

BACKGROUND

Video conference systems designed for conference room settings typically include one or more cameras such as one for the main video channel and a panoramic camera for a broad view of the participants. Such systems may also include a microphone array for capturing sounds with better quality. Conventional microphone array type devices typically include an arrangement of microphones in a predetermined layout. These microphones are generally used to capture sounds from various directions originating from different points in space. Some systems include on-board processing modules, which provide processing capabilities for the captured sound such as sound source localization, beam forming, acoustic echo cancellation, noise suppression, and the like.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to improving the image of a current speaker or other region of interest by determining selected region(s) of interest in video communications based on sound origination detection through use of infrared detection on satellite microphones, estimation of distance between satellite microphones and base unit utilizing captured audio and estimation of satellite microphone orientation utilizing captured audio. According to some embodiments, multiple sound source localization results may be combined to improve sound source localization and/or active speaker detection accuracy.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, regions of interest in video communications may be selected based on sound origination detection through use of infrared detection on satellite microphones, estimation of distance between satellite microphones and base unit utilizing captured audio, and estimation of satellite microphone orientation utilizing captured audio. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
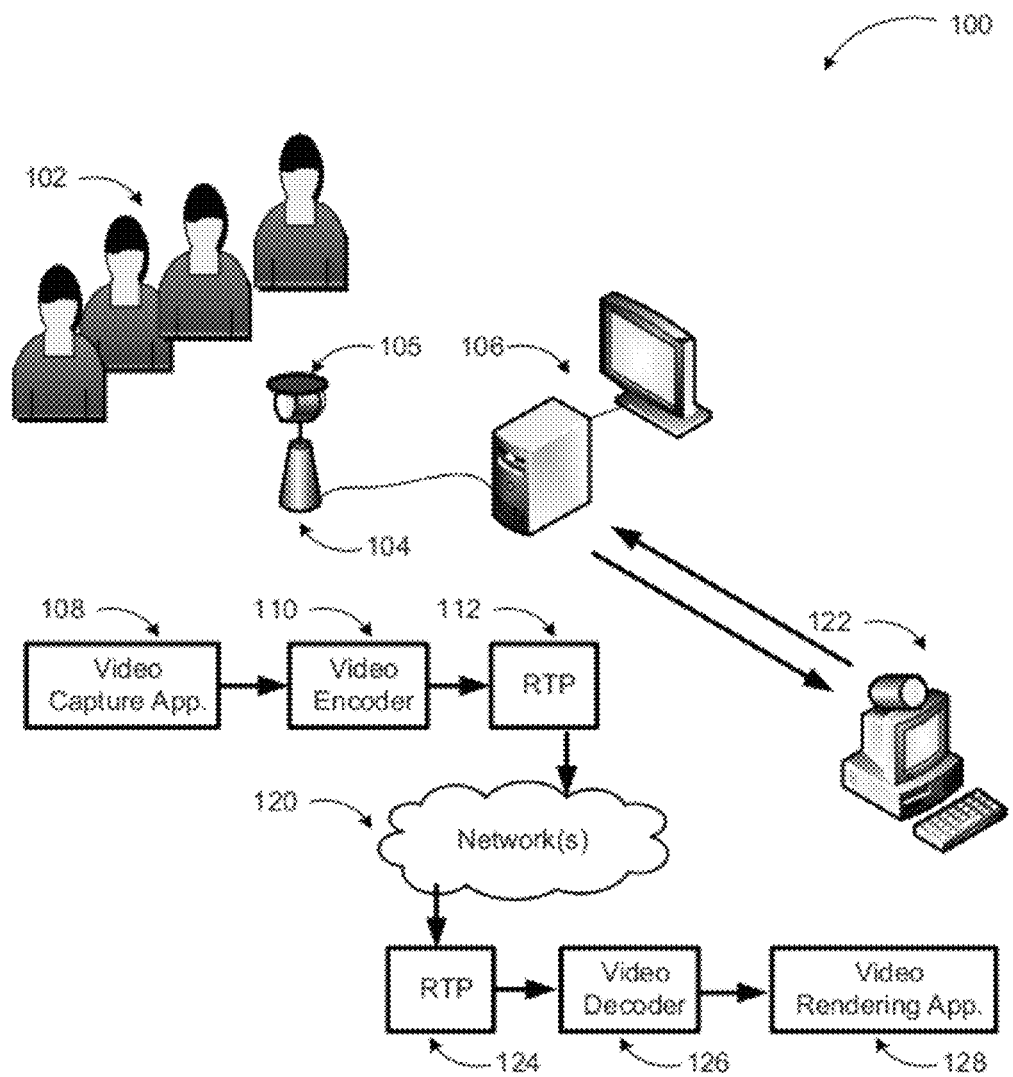
FIG. 1 is a conceptual diagram illustrating main components in a video communication system.

Referring to FIG. 1, conceptual diagram 100 with main components in a video communication system is illustrated. With the proliferation of Internet-based communication tools and applications, video applications that provide video communication over private or public networks have grown in number and variety. Such applications may be local applications residing on local computing devices (e.g. 106, 122) or hosted applications executed by a service and used by a client device/application remotely. In any case, video images are captured by a camera device such as a webcam.

Video conferencing systems allow for meetings to occur with visual interaction despite the fact that meeting participants may be located in different geographic locations. The visual aspect of video conferencing makes it typically more appealing than telephone conferences, while at the same time being a lower-cost alternative to (and typically can occur on shorter notice than) in-person meetings when one or more participants must travel to the meeting location.

Some video conferencing systems use automated detection techniques or presets to move the camera (e.g., pan or tilt the camera) for focusing on specific regions or people if multiple people are participating in one location. Sound source localization (SSL), multi-person detection (MPD), and active speaker detection (ASD) are some of the methods using audio and/or visual cues to select a region of interest in a video conference system. An SSL detector uses audio features such as sound detection from multiple microphones to detect the location of the speaker among multiple people. An MPD detector uses motion and image features (such as contours of a person, facial recognition, etc.) to determine the current speaker. An ASD detector uses sound source localization, motion, and image features to detect the current speaker.

As mentioned above, SSL is among many techniques used to detect and focus on region(s) of interest. Many such systems, however, only provide azimuth (direction) localization and not range or elevation. Without zooming the active speaker video capture, people farther away from the recording mechanism (typically a base unit with a camera and microphone) may be too small to be recognized. Furthermore, some systems utilize only partial duplex (not full duplex) mode because the loudspeaker and base microphones are spatially close and may have a high terminal coupling. Duplex performance may be achieved by not using the base microphones for send (but rather only SSL) and using the satellite microphones for the send path.

In FIG. 1, computing device 106 represents a computer (e.g. a server) connected to the source for the audio/video signals, which may be a base unit 104 capable of capturing audio and video. Other implementations may include audio/video capture devices with their own processing and communication capability, client devices with video capability, and the like. A typical video communication begins at computing device 106 with a video capture application 108, which captures frames of video through the camera. The video signal may first be passed through one or more processing blocks for filtering, backlighting adjustments, and the like.

The processed video signal is encoded in video encoder 110 for transmission over a network and provided to Real Time Protocol (RTP) block 112 for formatting the signal to be transported over the network. Any one of a number of network transportation protocols may be employed to transmit the signal to a receiving device (e.g. computing device 122). Network(s) 120 may include private or public networks such as the Internet, or a combination of the two. The signal is received by another RTP block 124 at the receiving device and translated. Video decoder 126 decodes the signal and provides the decoded signal to rendering application 128, which renders it on a display. In a practical implementation, the communication is bidirectional and both devices include video capturing and rendering application(s) for real time video communication. However, embodiments are not so limited. Unidirectional real time communications such as a video seminar that is disseminated to multiple receivers may also employ a non-parametric sign based noise determination technique according to embodiments.

Audio signals in the system may be captured by one or more microphones (105) of the base unit 104 and a number of satellite microphones (not shown) and processed in the base unit 104 or server 106.

Figure 2:
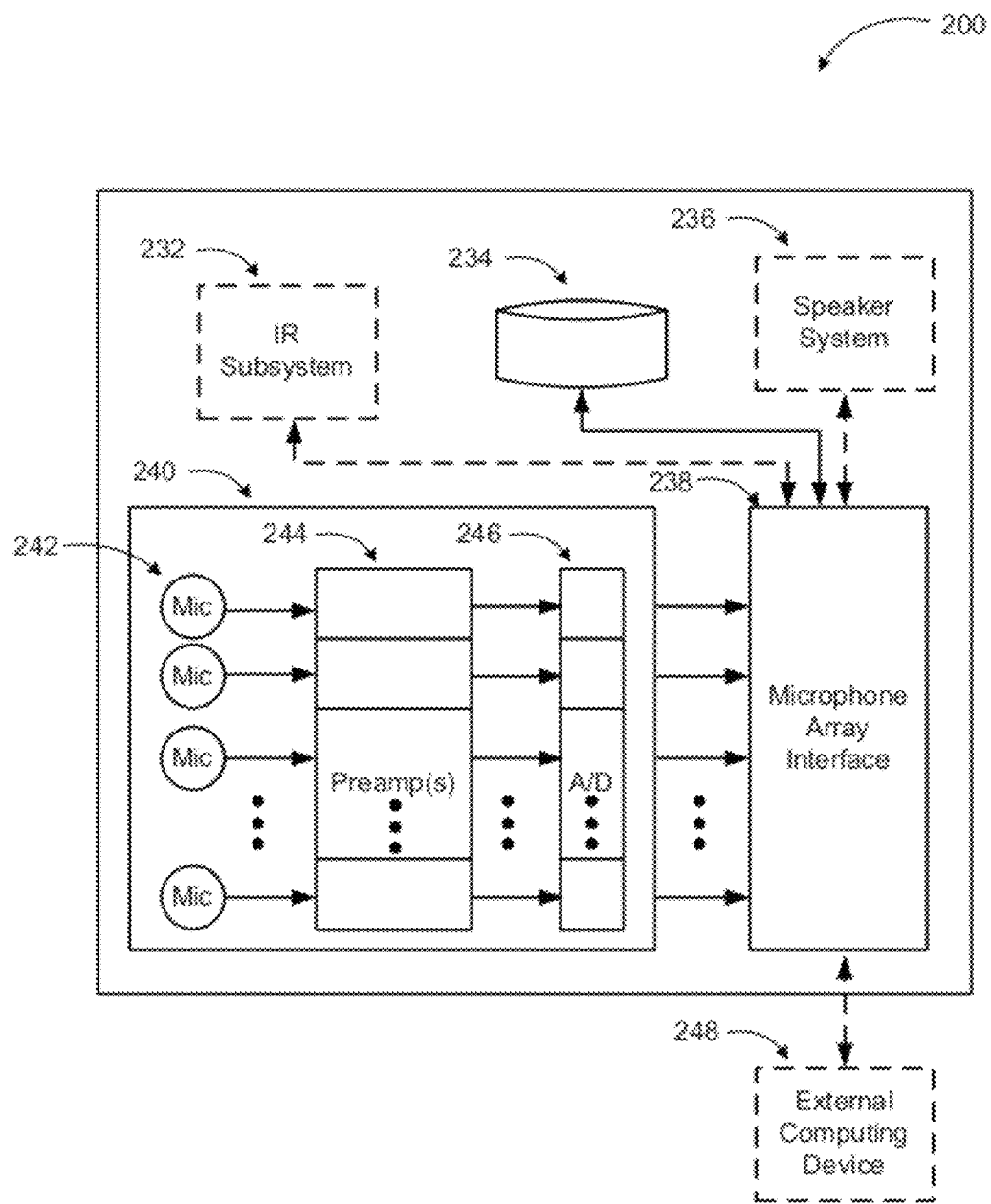
FIG. 2 is an example block diagram of a microphone array system with internal processing capabilities.

FIG. 2 is an example block diagram of a microphone array system 200 with internal processing capabilities. Microphone array system 200 may be implemented as a standalone unit or in more than one device as described in conjunction with FIG. 1.

Example microphone array system 200 comprises an array 242 of microphones, a microphone array memory 234 which may store parametric information that defines operational characteristics and configuration of the microphone array, and at least one external interface 238, including, for example, serial, IEEE 1394, USB, IEEE 802.11, Bluetooth®, etc., for connecting the microphone array system to an external computing device 228.

The array of microphones 242 included in the microphone array system 200 may include one or more preamplifiers 244 for providing gain or pre-amplification of each microphone. The array may further include one or more Analog-to-Digital (A/D) converters 246 for digitizing an analog audio input from each microphone. It should be noted that both preamplifiers and A/D converters are well known and understood by those skilled in the art, and are not described in detail herein.

According to some embodiments, the microphone array system 200 may include an infrared subsystem 232 for detecting location of satellite microphones and enhancing selection of regions of interest in video capture through sound source localization. The microphone array system 200 may also include a loudspeaker system 236. In general, this loudspeaker system 236 may include one or more loudspeakers, one or more D/A converters, and one or more amplifiers for amplifying analog audio signals prior to playback by the loudspeakers included in the loudspeaker system.

Figure 3:
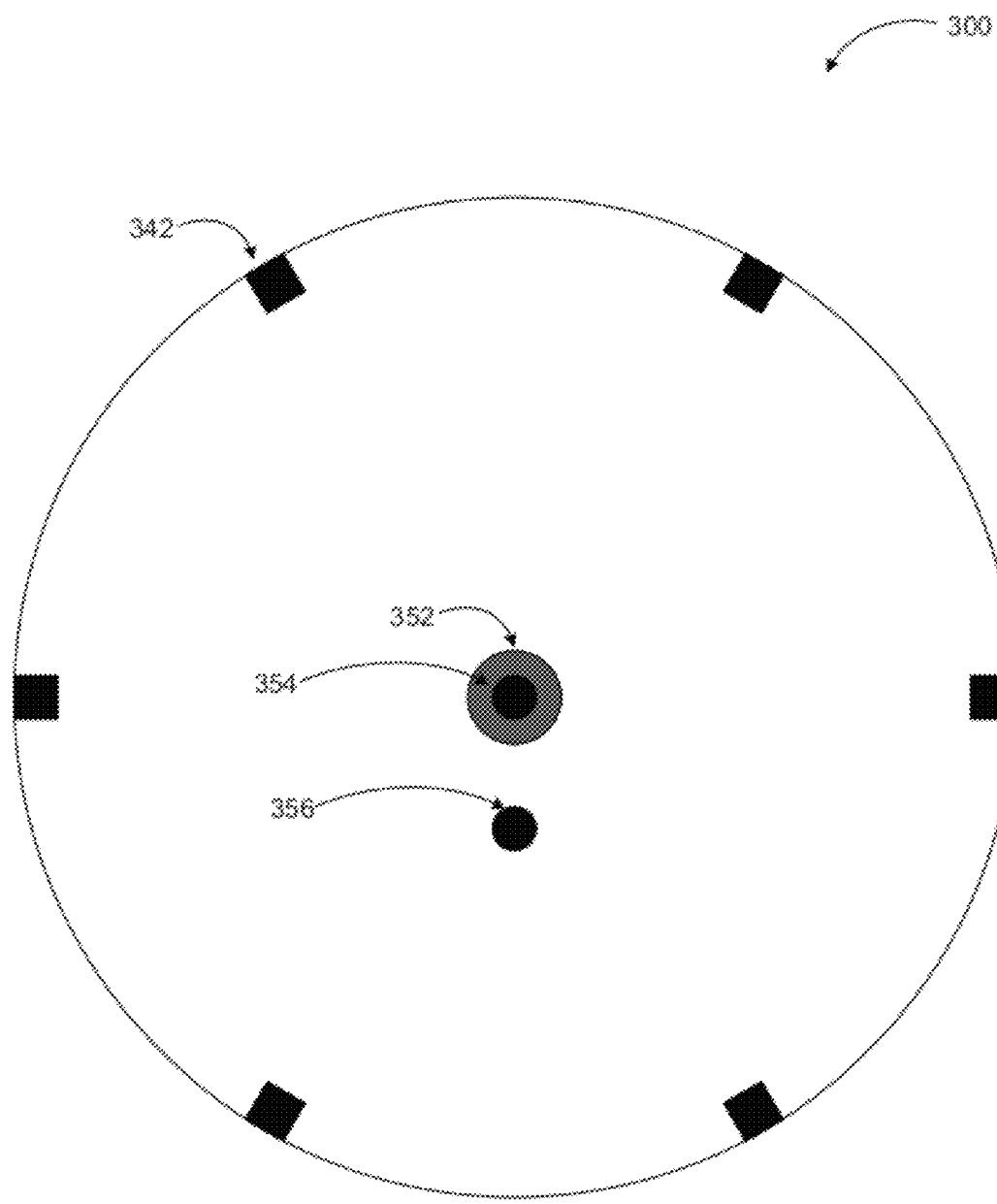
FIG. 3 illustrates a top view of an example satellite microphone in a video conference system.

FIG. 3 illustrates a top view of an example satellite microphone in a video conference system according to embodiments. A microphone array system according to embodiments may utilize a base unit and a plurality of satellite microphones with each satellite microphone comprising multiple microphones itself Example satellite microphone 300 has a hemispheric design with a central microphone 354 in the center and the highest point of the structure. Six microphones (e.g. 352) are located along the perimeter of the hemispheric structure close to the bottom surface (in this case the table top). Embodiments are not limited to the hemispheric structure and the number of microphones in the example satellite microphone. Any number of microphones may be used along the perimeter of the structure, but a minimum of three is needed for directionality.

According to one embodiment, an infrared Light Emitting Diode (LED) is positioned near the central microphone for enabling the base unit to determine a location of the satellite microphone 300. Of course any source of infrared light may be used in place of an LED in other embodiments. Single or multiple LEDs or combination of optical structures with an LED may also be used in various implementations. For example, a cylindrical light pipe may be positioned around the central microphone allowing the infrared light to be emitted in every direction from the top of the satellite microphone while the infrared LED is positions inside the structure.

According to an embodiment, the infrared LED has a frequency close to an infrared cutoff frequency of the camera.

Figure 4:
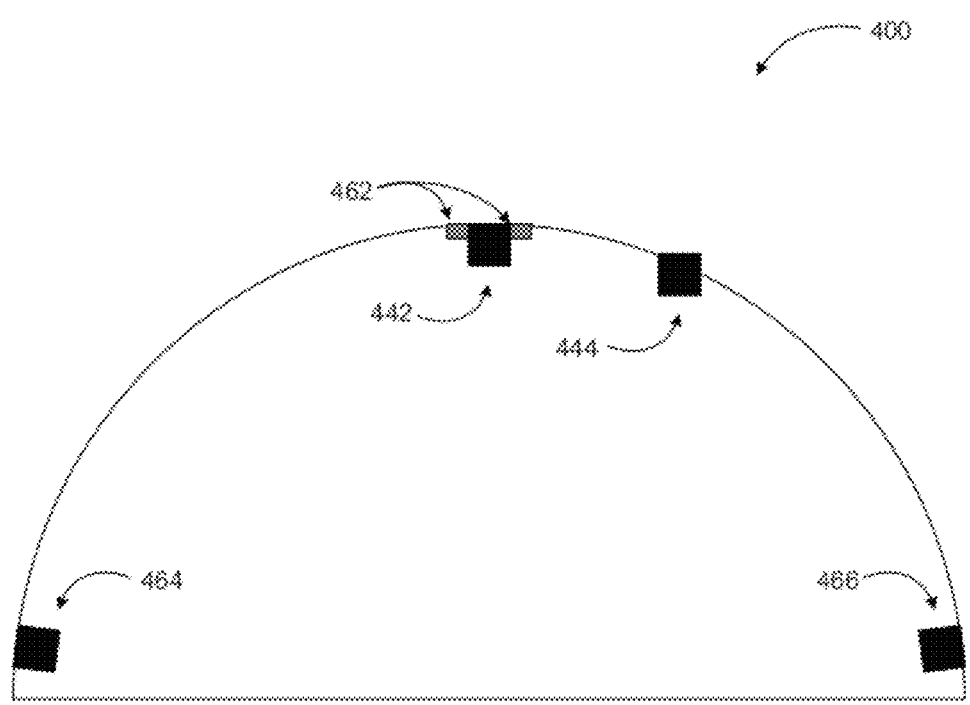
FIG. 4 illustrates a side view of an example satellite microphone in a video conference system.

FIG. 4 illustrates a side view of an example satellite microphone in a video conference system according to embodiments. The side view of the example satellite microphone 400 includes two of the peripheral microphones 464 and 466 positioned close to the base of the structure (table surface) with the central microphone 442 located at the top of the structure, and an infrared source 462 located about the central microphone 442. As discussed above the infrared source may be one or more infrared LEDs or a combination of a light pipe structure with a source LED positioned elsewhere within the satellite microphone 400.

Figure 5A:
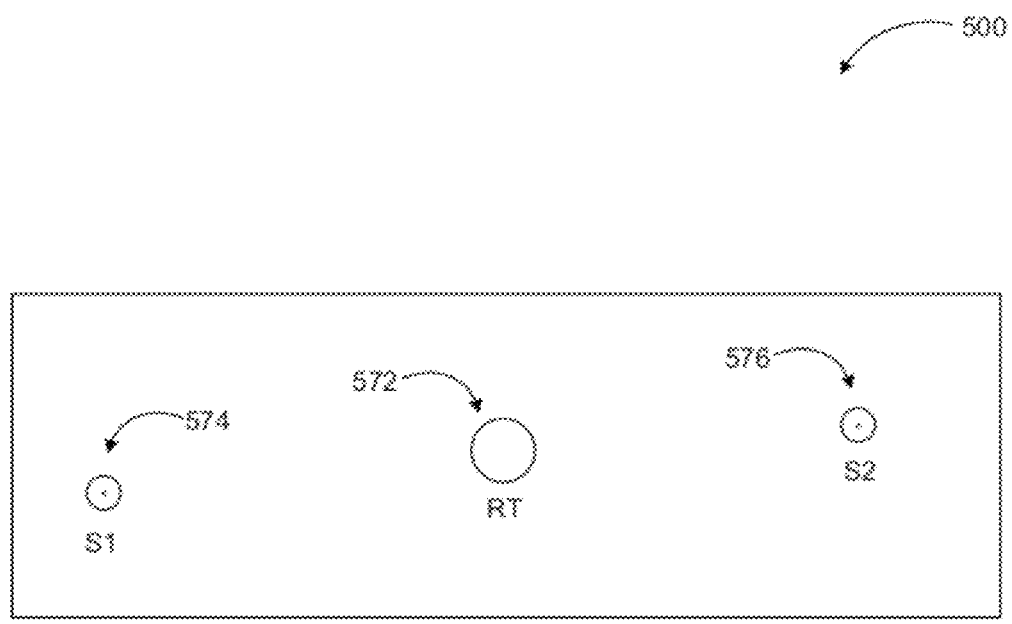
FIG. 5a illustrates a top view of an example video conference system with two satellite microphones and a base unit.

FIG. 5a illustrates a top view of an example video conference system 500 with two satellite microphones and a base unit according to embodiments. Satellite microphones S1 and S2 (574, 576) include infrared LEDs for detection of their location by the base unit 572. The infrared signals may be detected by the video capture device itself (e.g. camera) or by a separate infrared detection device on the base unit.

Once the base unit 572 detects the satellite microphone through the infrared emission, the known geometry of the video capture device (e.g. height, field of view) may be used to estimate a distance of the satellite microphone from the base unit. According to another embodiment, the distance may be estimated through the time of arrival of the sound from the base unit to the satellite microphone using the loudspeaker in the base unit synchronized with the satellite microphone. In this latter approach, the distance d may be determined as c*T, where c is the speed of sound and T is the time of arrival.

The orientation of the satellite microphones with respect to the base unit may be determined also using sound signals from the base unit. Specifically, when far end signals are played from the base unit loudspeaker and there are no near end signals (i.e. no double talk), then the satellite microphone array's peak SSL probability distribution function should point to the base unit.

Figure 5B:
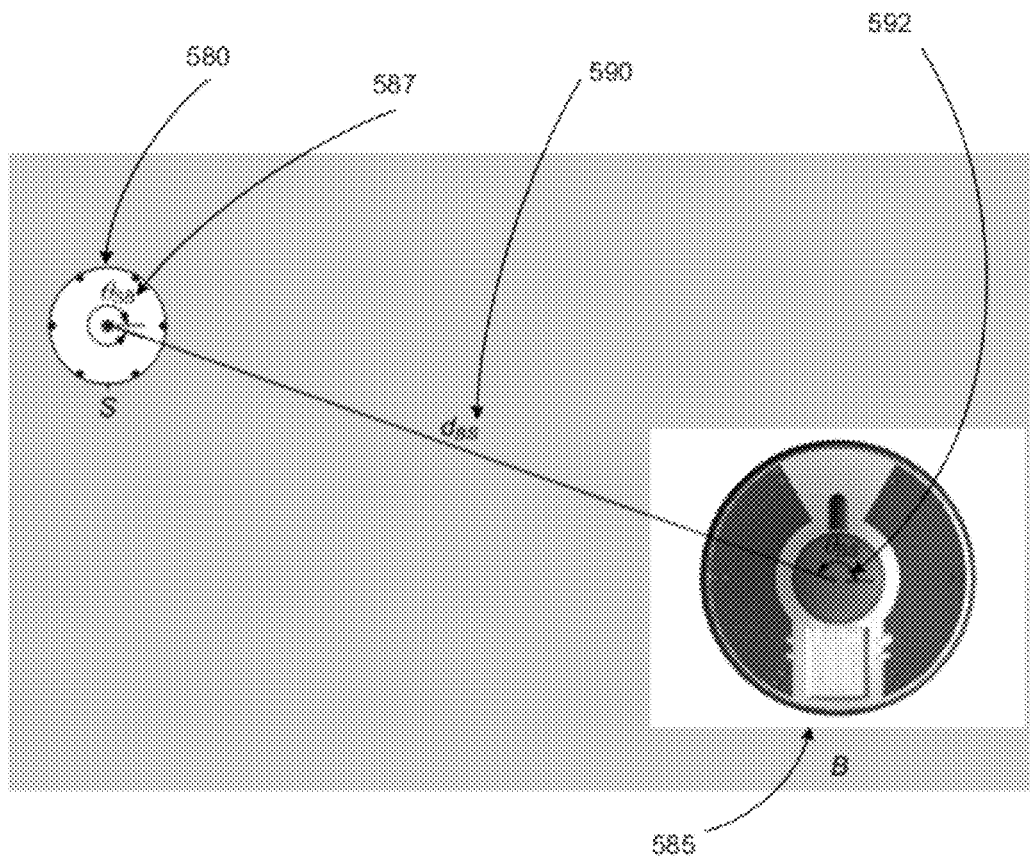
FIG. 5b illustrates a top view of another example video conference system with one satellite microphone system and a base unit.

FIG. 5b illustrates a top view of another example video conference system with one satellite microphone system and a base unit for illustrating the use of satellite microphones to improve the accuracy of detecting human speakers or other generators of sound in video conferencing or other like systems. As described herein, according to an embodiment, in order to determine who is speaking, microphone arrays including the base 585 and the satellite microphone system 580 may be used to determine a relative location of a given speaker. According to one embodiment, as illustrated in FIG. 5b, the results of these determinations may be combined by knowing where the satellite microphone 580 is with respect to the base 585 and by knowing the relative orientation of the satellite microphone with respect to the base. That is, by knowing the relative orientation of the location of the satellite microphone S (580) and base (585), the SSL PDFs may be combined. As set out above, the SSL is the sound source localization and the PDF is the probability distribution function. This combined value or information allows a determination of the direction from which the human speaker is coming That is, the PDF gives a probability of a direction (from 0 to 359 degrees) from which the human speaker is generating sound (e.g., speaking).

According to an embodiment, two methods for generating the combined SSL PDFs may be employed. A first method may be stated as follows: A Base B (585) emits a sound; the Satellite microphone system S (580) estimates an angle θ SB and a distance d SB; the Satellite microphone system S (580) emits a sound; and the Base B (585) estimates the angle θ BS and the distance d BS. According to this first method, the base emits a sound out of the speaker, which may either be a test sound or human speech. The satellite microphone 580 estimates the angle between the satellite and the base (θ SB) and the distance between the satellite and the base (d SB). Then, the satellite microphone S emits a sound, and the base B estimates the angle between the base and the satellite (θ SB) and the distance between the base and the satellite (d BS). The d SB and d BS should be the same, but the two estimated angles (θ SB) and (θ BS) will not be the same, and the two estimated angles can change anytime the satellite microphone is rotated such that the individual microphones in the satellite microphone system move relative to the base.

A second method may be stated as follows: A Base B (585) emits a sound; the Satellite microphone system S (580) estimates an angle θ SB and a distance d SB; and the Base B (585) uses an infrared signal (IR) from the Satellite S to estimate the angle θ BS and the distance d BS. According to this method, the satellite microphone does not need to emit a sound. The base can always emit a sound because it is a speaker phone, and whenever a person is speaking from the far end of a given videoconference an estimation of the relative distances and angles may be computed anytime sound is being emitted from the base. According to this embodiment, typically the satellite 580 would not emit sound because there is typically no loudspeaker associated with the satellite S. The satellite may include a speaker for emitting some type of sound for use according to the first method described above, for example, a sound that is outside the human hearing frequency range. Thus according to each of the two methods described above, the combined SSL PDFs may be determined for obtaining the relative orientations of the satellite and base and the relative locations of the satellite and base for improving the detection of a human speaker or other generator of sound using the system 100, described above.

The enhanced SSL approaches described above may be combined, normalized, and provided to the ASD module of the video conference system for detection and focusing on the region of interest for video capture. According to one embodiment, the SSL results may be directly provided to the ASD module for prioritization and determination, which one (or combination) is to be used for active speaker detection. For example, the infrared-based method may provide a more accurate result compared to the time of arrival based result due to an acoustic structure of the room, and the ASD may select the first method over the time of arrival method. The ASD may also combine the results for an even more accurate estimation of the sound source location.

According to another embodiment, the SSL results may be normalized and added to a three dimensional discrete probability distribution function representing the conference room. The three dimensional discrete probability distribution function may then be provided to the ASD module for detection of the active speaker.

Figure 6:
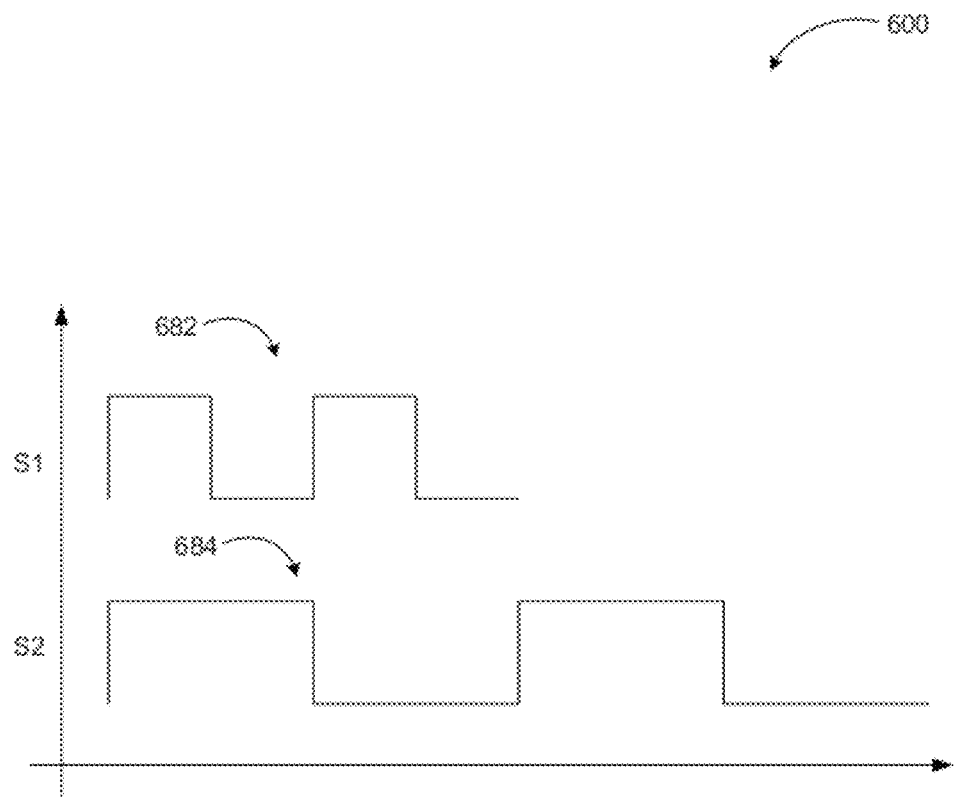
FIG. 6 illustrates example infrared signals for the satellite microphones of the example systems of FIGS. 5a and 5b.

FIG. 6 illustrates example infrared signals for the satellite microphones of the example system of FIG. 5. As shown in diagram 600, the satellite microphone arrays may use a structured infrared signal, which is visible to the base unit camera, but invisible to local participants. It should be noted that even though many cameras have infrared cut filters, an infrared signal close to the cut filter cutoff frequency is still detectable by the camera. The signal may not be strong (e.g. have a high SNR), but a structured signal may be used to make detection possible. The signal may be an easy to detect signal such as S1 (682) for the first satellite microphone and S2 (684) for the second satellite microphone with distinct frequencies (e.g. 7.5 Hz and 3.75 Hz, respectively). The different frequencies make it easy to distinguish the satellite microphones S1 and S2. Many other signals may be used to enable the base unit detect the satellite microphones according to other embodiments.

Figure 7:
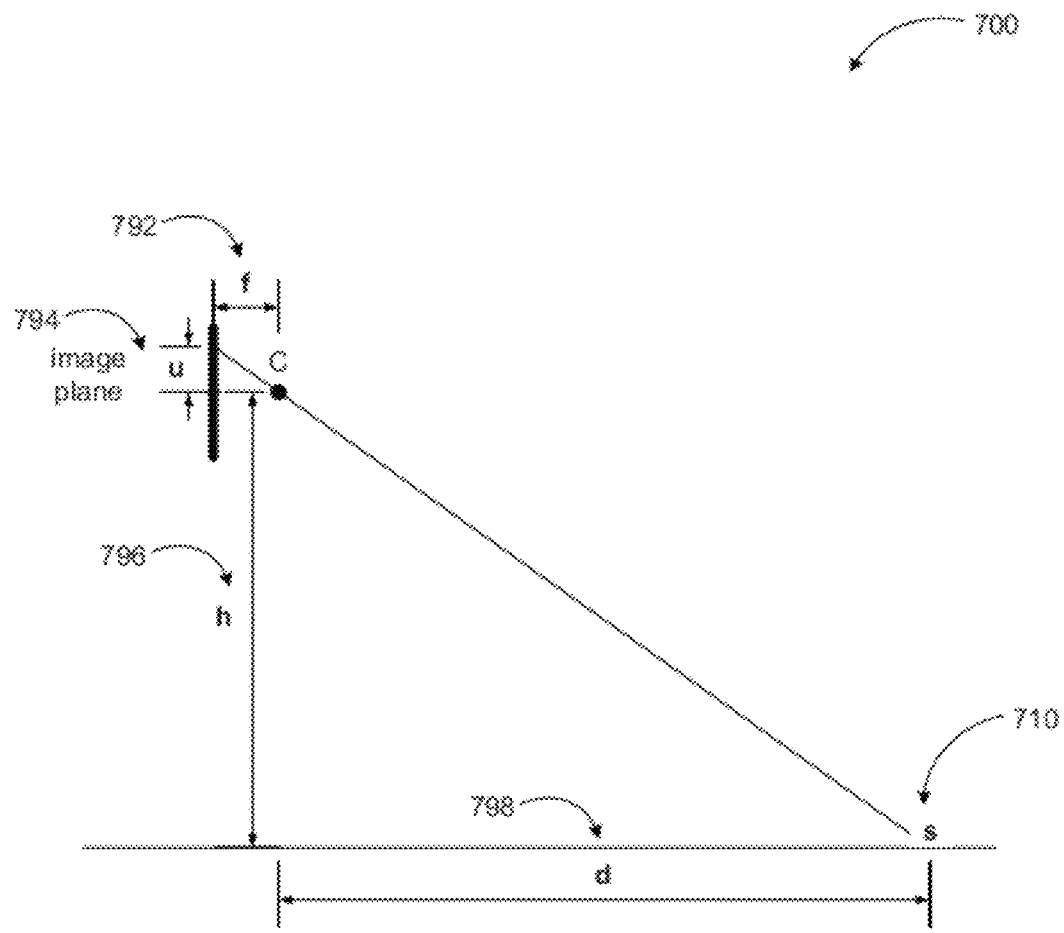
FIG. 7 illustrates a diagram of how the distance of a satellite microphone from the camera with focal length f and height h from the table can be estimated according to one embodiment.

FIG. 7 illustrates a diagram of how the distance d (798) of a satellite microphone from the camera with focal length f (792) and height h (796) from the table can be estimated according to one embodiment. As mentioned above, upon detecting the infrared signal from the satellite microphone (e.g. locating it in the captured video image), the known geometry of the base unit may be used to estimate the location of the satellite microphone on the table.

In an example system, assuming a cylindrical panoramic camera, with a focal length of f (792), distance from satellite s (710) infrared LED projected on the image plane to the image plane center of u (794), and camera height of h (796), the distance d may be estimated by:

$$d = h * f / u \quad [1]$$

The orientation of the satellite microphone may be estimated by:

$$\theta = v * 360 / x_{max}, \text{ where} \quad [2]$$

v is the x image coordinate and $x_{max}$ is the maximum x coordinate in the image sensor.

The methods described above for selection of regions of interest and sound source localization are not limited to the listed examples. Other mechanisms and microphone configurations may also be employed for selecting regions of interest with sound source localization assistance using the principles described herein.

Figure 8:
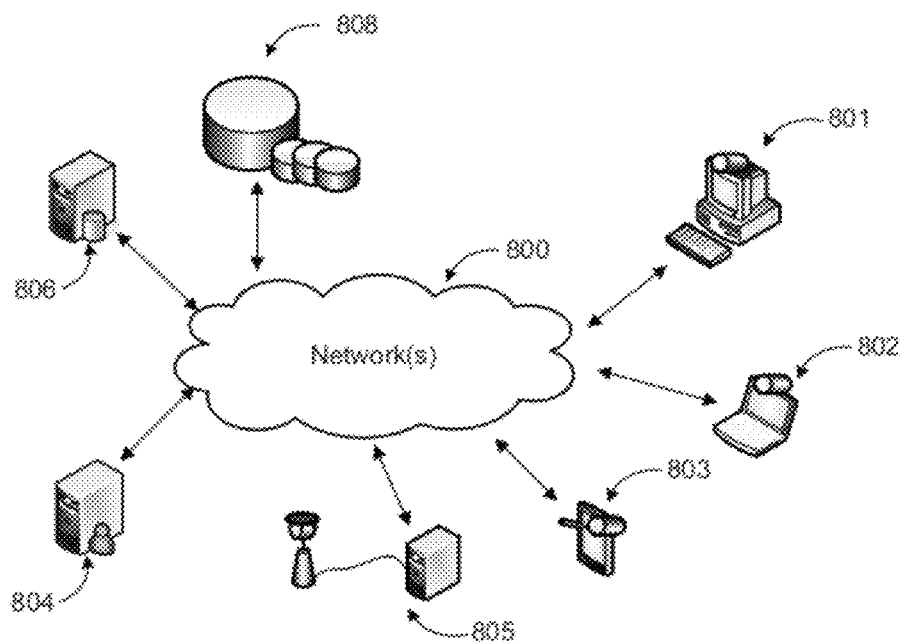
FIG. 8 illustrates a networked environment where embodiments may be implemented.

FIG. 8 is an example networked environment, where embodiments may be implemented. Active speaker selection in a video conference system using infrared and other sound source localization approaches according to embodiments may be implemented locally or in a distributed manner over a number of physical and virtual clients and servers. It may also be implemented in un-clustered systems or clustered systems employing a number of nodes communicating over one or more networks (e.g. network(s) 800).

Such a system may comprise any topology of servers, clients, Internet service providers, and communication media. Also, the system may have a static or dynamic topology. The term "client" may refer to a client application or a client device. While a networked system implementing embodiments may involve many more components, relevant ones are discussed in conjunction with this figure.

Audio/video capture applications may be executed and video rendered in individual client devices 801-803. Enhanced sound source localization for selecting a region of interest (e.g. active speaker) according to embodiments may be implemented in a standalone video conference device (804) or a server managing the video conference device such as server 805. A portion or all of the generated audio and video may be stored instead of being instantaneously rendered. In that scenario, the audio/video files may be stored in a data store such as data stores 808 and provided to the rendering application(s) in individual client devices subsequently through database server 806 or retrieved directly by the rendering application(s).

Network(s) 800 may include a secure network such as an enterprise network, an unsecure network such as a wireless open network, or the Internet. Network(s) 800 provide communication between the nodes described herein. By way of example, and not limitation, network(s) 800 may include wired media such as a wired network or direct-wired connection, and wireless media such as acoustic, RF, infrared and other wireless media.

Many other configurations of computing devices, applications, data sources, data distribution systems may be employed to implement a conference system with enhanced active speaker selection. Furthermore, the networked environments discussed in FIG. 8 are for illustration purposes only. Embodiments are not limited to the example applications, modules, or processes.

Figure 9:
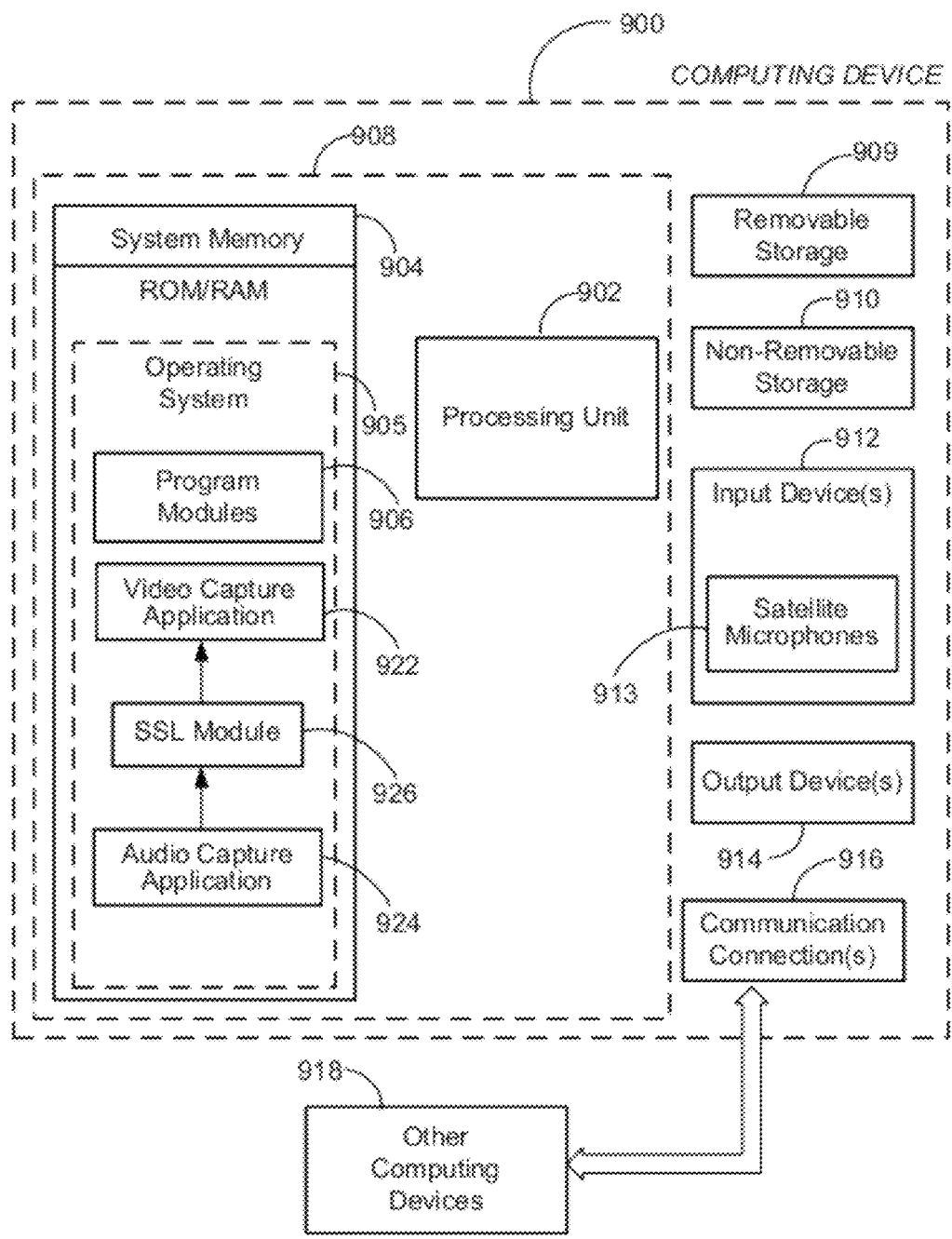
FIG. 9 is a block diagram of an example computing operating environment, where embodiments may be implemented.

FIG. 9 and the associated discussion are intended to provide a brief, general description of a suitable computing environment in which embodiments may be implemented. With reference to FIG. 9, a block diagram of an example computing operating environment is illustrated, such as computing device 900. In a basic configuration, the computing device 900 may be a standalone video conference device executing an audio/video capture application or a server managing such a device and typically include at least one processing unit 902 and system memory 904. Computing device 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the computing device, such as the WINDOWS® operating systems from MICROSOFT CORPORATION of Redmond, Wash. The system memory 904 may also include one or more software applications such as program modules 906, video capture application 922, audio capture application 924, and SSL module 926.

Audio and video capture applications 922 and 924 may be separate applications or integral modules of a hosted service application that provides video conferencing services based on received audio and video signals from one or more cameras and microphones associated with computing device 900. SSL module 926, according to one embodiment, estimates locations of satellite microphones as described previously and provides feedback to the video capture application 922 for selection of active speaker. This basic configuration is illustrated in FIG. 9 by those components within dashed line 908.

The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and non-volatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Specifically for video conferencing according to embodiments, input devices 912 may include at least two satellite microphones 913 and a base unit microphone. Output device(s) 914 such as a display, loudspeakers, printer, etc. may also be included. One of the output devices, a loudspeaker in the base unit, may be used to estimate a distance of satellite microphones as discussed previously.

The computing device 900 may also contain communication connections 916 that allow the device to communicate with other computing devices 918, such as over a wireless network in a distributed computing environment, for example, an intranet or the Internet. Other computing devices 918 may include client devices or server(s) that execute applications associated with rendering audio/video signals from audio and video capture applications 922 and 924 in computing device 900. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. While the presence of a modulated data signal may be transitory in nature, the signal is generated to cause changes in a receiving device, thereby creating physical and tangible changes (effects) during its reception by the receiving device. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 10:
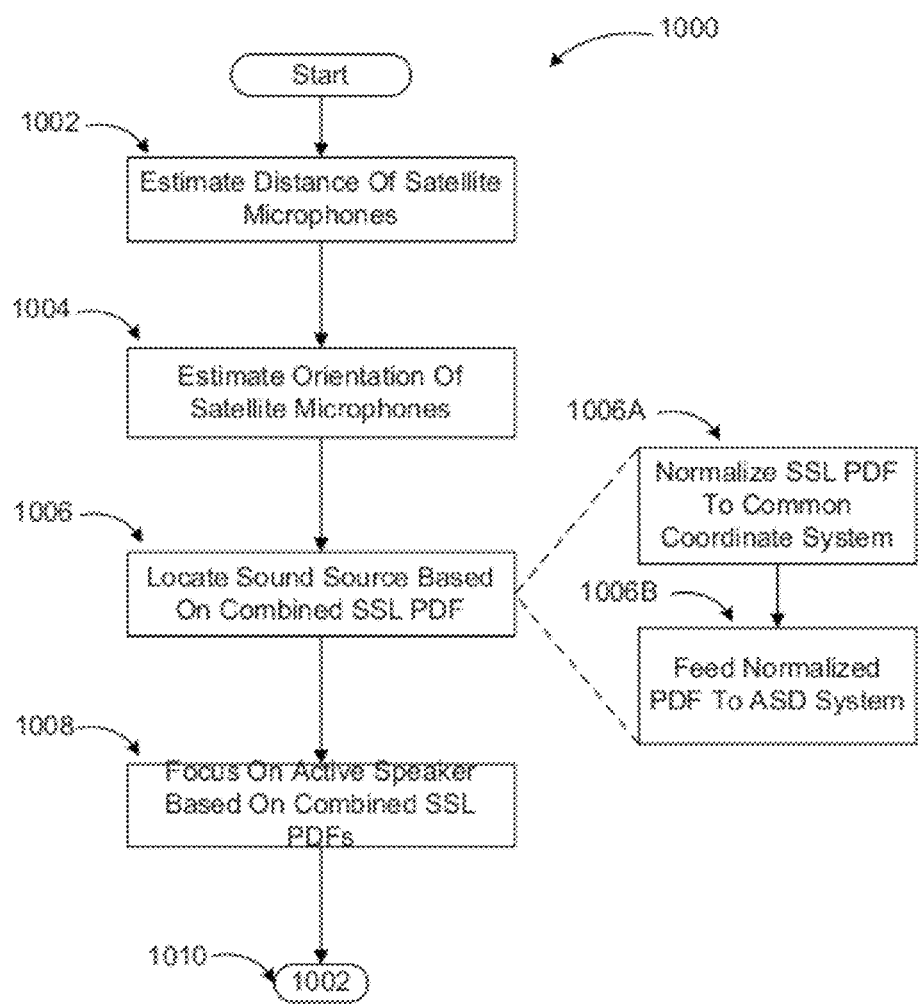
FIG. 10 illustrates a logic flow diagram for a process of using infrared signals and sound source localization for selecting region of interest with enhanced accuracy according to embodiments.

FIG. 10 illustrates a logic flow diagram for process 1000 of using infrared signals and sound source localization for selecting region of interest with enhanced accuracy according to embodiments. Process 1000 may be implemented, for example, as part of a video conference capture device.

Process 1000 begins with operation 1002, where a distance of satellite microphones within the video conference system are estimated using infrared detection of each satellite microphone, time of arrival of the sound from base unit loudspeaker to the satellite microphones, or both methods. Processing moves from operation 1002 to operation 1004.

At operation 1004, an orientation of the satellite microphones is determined According to one embodiment, the orientation of the satellite microphones to the base may be determined using one of the two methods described above with reference to FIG. 5b. Processing advances from operation 1004 to operation 1006.

At operation 1006, the sound source is located based on the estimated satellite microphone distances and orientations. According to one embodiment, operation 1006 may include at least two steps. In step 1006A, SSL results (PDF) from individual microphones may be normalized to a common coordinate system. Then, at step 1006B, the normalized PDF may be provided to the Active Speaker Detection (ASD) module. Knowing the satellite microphone locations and orientations allows the SSL results (e.g. from S1 (574), RT (572) and S2 (576) in FIG. 5) to be put into a common reference coordinate system and combined to better detect the true sound sources and ultimately a better speaker location estimate than using just one of the SSL results. The accurately determined sound source location is provided to the ASD module for the video capture application of the video conference system, which at subsequent operation 1008 focuses the video capture device (camera) on the active speaker based on the enhanced SSL information.

After operation 1008, processing loops back to operation 1002 and repeats continuously as long as the system 100 operates and the process of focusing on an active speaker or other generator of sound is required.

The operations included in process 1000 are for illustration purposes. Active speaker detection with enhanced sound source localization may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A video conferencing device for enhanced detection of an active human speaker through sound source localization, the device comprising:

at least two satellite microphone modules, wherein each satellite microphone module includes at least three microphones and an infrared light source, wherein the satellite microphone modules are configured to:
estimate a first orientation and a first distance of a satellite microphone module closest to the active human speaker by the satellite microphone module closest to the active human speaker based on detecting a sound emitted from a loudspeaker on a base unit at the satellite microphone module closest to the active human speaker;

the base unit coupled to the satellite microphone modules that includes a video capture device and at least one microphone, wherein the base unit is configured to:
estimate a second orientation and a second distance of the satellite microphone module closest to the active human speaker by the base unit based on detecting another sound emitted from the satellite microphone module at the base unit;
estimate a third orientation and a third distance of the satellite microphone module closest to the active human speaker by the base unit based on detecting an infrared light emitted from the satellite microphone module at the base unit; and
determine a location of the satellite microphone module closest to the active human speaker by comparing one of two pairs of estimated distances and orientations, the pairs comprising: the first and the second orientations and distances, and the second and the third orientations and distances; and
focus a video capture device of the base unit on the active human speaker based on the determined location of the satellite microphone module closest to the active human speaker.

2. The computing device of claim 1, wherein the satellite microphone modules are designed as a hemispheric structure with one microphone located at the top of the hemispheric structure and at least three microphones are located along a perimeter of a bottom surface of the hemispheric structure, and include a loudspeaker for emitting the other sound to estimate the second orientation and distance.

3. The computing device of claim 1, wherein the base unit is further configured to:
    estimate an orientation of the satellite microphone module closest to the active human speaker based on a lack of double-talk when sound is received through both the satellite microphone module closest to the active human speaker and the base unit.

4. The computing device of claim 1, wherein the base unit is further configured to:
    generate a discrete probability distribution function (PDF) for a conference room;
    normalize results from the estimations of satellite microphone module orientations and distances;
    combine the normalized results with the conference room PDF; and
    focus the video capture device on the active human speaker based on the combined PDF.

5. The computing device of claim 1, wherein the base unit includes: a main video capture device, a panoramic video capture device, a microphone array computation module, and an external device interface, and wherein the emitted sound includes one of: an audible test tone, an inaudible test tone, and regular speech.

6. The computing device of claim 5, wherein the determination of the location of the satellite microphone module closest to the active human speaker is performed at one of: the base unit and a computing device coupled to the base unit through the external device interface.

7. A computer-readable storage device with computer-readable instructions stored thereon for enhanced detection of an active human speaker through sound source localization in a video conference system, the computer-readable instructions comprising: estimating a first orientation and a first distance of a satellite microphone module closest to the active human speaker by a base unit based on detecting an infrared light emitted from the satellite microphone module at the base unit; estimating a second orientation and a second distance of the satellite microphone module closest to the active human speaker by the base unit based on detecting a sound emitted from a loudspeaker on the satellite microphone module closest to the active human speaker at the base unit; estimating a third orientation and a third distance of the satellite microphone module closest to the active human speaker by the satellite microphone module based on detecting another sound emitted from the base unit at the satellite microphone module closest to the active human speaker; determining a location of the satellite microphone module closest to the active human speaker by comparing one of two pairs of estimated distances and orientations, the pairs comprising: the first and the second orientations and distances, and the second and the third orientations and distances, wherein the second distance is estimated by computing the distance based on a time of arrival of a sound emitted from a loudspeaker on the base unit at the satellite microphone module upon synchronizing the base unit and the satellite microphone module, and wherein the second orientation is estimated based on a lack of double-talk when sound is received through both the satellite microphone module closest to the active human speaker and the base unit; and focusing a video capture device of the base unit on the active human speaker based on the determined location of the satellite microphone module closest to the active human speaker.

8. The computer-readable storage device of claim 7, wherein the computer-readable instructions further comprise: emitting a test sound from the loudspeaker of the base unit comprising one of: an audible test tone, an inaudible test tone, and regular speech for determining the lack of double-talk.

9. The computer-readable storage device of claim 7, wherein the emitted infrared light has distinct characteristics for each satellite microphone module of a plurality of satellite microphone modules coupled to the base unit.

10. A method of utilizing a video conferencing device for enhanced detection of an active human speaker through sound source localization, comprising:
    providing at least two satellite microphone modules, wherein each satellite microphone module includes at least three microphones and an infrared light source;
    estimating a first orientation and a first distance of a satellite microphone module closest to the active human speaker by the satellite microphone module closest to the active human speaker based on detecting a sound emitted from a loudspeaker on a base unit at the satellite microphone module closest to the active human speaker;
    providing a base unit coupled to the satellite microphone modules that includes a video capture device and at least one microphone;
    estimating a second orientation and a second distance of the satellite microphone module closest to the active human speaker by the base unit based on detecting another sound emitted from the satellite microphone module at the base unit;
    estimating a third orientation and a third distance of the satellite microphone module closest to the active human speaker by the base unit based on detecting an infrared light emitted from the satellite microphone module at the base unit;
    determining a location of the satellite microphone module closest to the active human speaker by comparing one of two pairs of estimated distances and orientations, the pairs comprising: the first and the second orientations and distances, and the second and the third orientations and distances; and
    focusing a video capture device of the base unit on the active human speaker based on the determined location of the satellite microphone module closest to the active human speaker.

11. The method of claim 10, wherein the satellite microphone modules are designed as a hemispheric structure with one microphone located at the top of the hemispheric structure and at least three microphones are located along a perimeter of a bottom surface of the hemispheric structure, and include a loudspeaker for emitting the other sound to estimate the second orientation and distance.

12. The method of claim 10, further comprising estimating, by the base unit, an orientation of the satellite microphone module closest to the active human speaker based on a lack of double-talk when sound is received through both the satellite microphone module closest to the active human speaker and the base unit.

13. The method of claim 10, further comprising:
    generating, by the base unit, a discrete probability distribution function (PDF) for a conference room;
    normalizing results from the estimations of satellite microphone module orientations and distances;
    combining the normalized results with the conference room PDF; and focusing the video capture device on the active human speaker based on the combined PDF.

14. The method of claim 10, wherein the emitted sound comprises an audible test tone.

15. The method of claim 10, wherein the emitted sound comprises an inaudible test tone.

16. The method of claim 10, wherein the emitted sound comprises and regular speech.

17. The method of claim 10, wherein determining a location of the satellite microphone module closest to the active human speaker comprises determining the location of the satellite microphone at the base unit.

18. The method of claim 10, wherein determining a location of the satellite microphone module closest to the active human speaker comprises determining the location of the satellite microphone at a computing device coupled to the base unit through an external device interface in the base unit.

* * * * *